United States Patent [19]

Pollock et al.

[11] Patent Number: 4,990,322
[45] Date of Patent: Feb. 5, 1991

[54] NACL:OH COLOR CENTER LASER

[75] Inventors: Clifford R. Pollock; Joseph F. Pinto; Efstratios Georgiou, all of Ithaca, N.Y.

[73] Assignee: Cornell Research Foundation, Inc., Ithaca, N.Y.

[21] Appl. No.: 555,365

[22] Filed: Jul. 19, 1990

Related U.S. Application Data

[60] Continuation of Ser. No. 295,963, Jan. 11, 1989, abandoned, which is a division of Ser. No. 870,810, Jun. 5, 1986, Pat. No. 4,839,009.

[51] Int. Cl.$^5$ ............................ C01D 3/04; H01S 3/17
[52] U.S. Cl. ..................................... 423/499; 372/20; 372/42; 204/157.48
[58] Field of Search ...................... 204/157.41, 157.48; 372/42, 20; 156/604; 423/499

[56] References Cited

U.S. PATENT DOCUMENTS 3,629,100 12/1971 Hersh ................................ 423/499
3,826,817 7/1974 Pastor et al. ...................... 423/499

Primary Examiner—Jeffrey E. Russel
Assistant Examiner—Brian M. Bolam
Attorney, Agent, or Firm—Jones, Tullar & Cooper

[57] ABSTRACT

A powerful and stable color center laser is provided by additively colored NaCl:OH$^-$ crystals. The OH$^-$ impurity is the key dopant for creating color center lasing in NaCl, providing an output tunable over the 1.41 to 1.81 $\mu$m region. In addition, modelocked pulses of 5 psec duration are available in a synchronously pumped arrangement, tunable from 1.47 to 1.73 $\mu$m.

9 Claims, 3 Drawing Sheets

NACL:OH COLOR CENTER LASER

BACKGROUND OF THE INVENTION

This invention relates to work supported in part by National Science Foundation grant ECS 8307556 and by grant DMR 82-17227.

This application is a continuation of application Ser. No. 07/295,963, filed 1/11/89, abandoned which is a division of SN 06/870,810, filed 6/5/86, now U.S. Pat. No. 4,839,009.

The present invention relates, in general, to color center lasers, and more particularly to a stable color center laser exhibiting improved power capabilities and capable of producing light in the range from 1.41 μm to 1.81 μm. The laser of the present invention represents the first powerful source of tunable laser radiation above 1.6 μm.

Broadly tunable, continuous wave solid state color center lasers are known, as evidenced by U.S. Pat. No. 4,301,426 to Schneider, the disclosure of which is incorporated herein by reference. As therein stated, particularly useful ranges of laser tunability are the infrared and near infrared spectral regions, which are important for selecting the specific wavelength of minimum loss for fiber-optic communications, for the molecular spectroscopic analysis of many of the primary and secondary vibrational modes of a wide variety of organic and inorganic molecules, for pollutant detections and for semiconductor spectroscopic analysis. At present, few acceptable tunable lasers exist for the infrared and near-infrared regions. Organic dyes are moderately effective in the visible region, but fail completely for wavelengths greater than about one micron. Parametric oscillators are useful but are expensive, cumbersome, and often low-powered. The most promising materials for tunable lasing beyond one micron are alkali halides containing homogeneously broadened color centers.

A number of tunable color-center lasers have been reported, e.g., (1) U.S. Pat. No. 3,970,960 issued on July 20, 1976 to Linn F. Mollenauer, (2) B. Fritz et al, "Laser Effect in KCl with $F_A$ (Li) Centers", in Solid State Communications, 3(3): pp. 61–68 1965, and (3) "A Primer on F-center Lasers", in Electro-Optical Systems Design pp. 26–29, Sept. 1978. The color centers which have been made to lase in these systems are the $F_A(II)$ center in several host crystals such as KCl and RbCl; the $F_A$ (II) center in several host crystals such as KCl and TbCl; the $F_b$ (II) center in KCl and the $F_2^+$ center in KCl, NaCl, KF, LiF, NaF, and KI. The $F_A(II)$ and the $F_B(II)$ centers, although useful, are limited to wavelengths between 2.2 and 3.6 microns and have a maximum output power of about 100 mw. Furthermore, it is necessary to use three different crystals in order to cover this spectral range. The $F_2^+$ center in the presently used crystals, e.g., KCl and KF, can produce several watts of power very efficiently, but is created in an impractical manner which requires that the crystal first be irradiated with 2 MeV electrons at 77° K., briefly annealed to room temperature or below, and then cooled back to 77° K. The crystal must then remain indefinitely at 77° K. in order to retain its color centers and lasing capability. Unfortunately, crystals containing $F_{2+}$ centers produced in this manner exhibit a longterm optical fatigue that causes the laser capability of the material to disappear. These crystals then require an impractical continued reprocessing with a 1 to 2 MeV-electron accelerator.

The device described in Patent No. 4,301,426 produces a tunable color-center laser which can be stored at room temperature from an isotropic crystal comprising primarily of $(F_2^+)_A$, $(F_2)_A$, $F_A$, $F_A'$, $F_B$, and $F_B'$ color centers in dynamic equilibrium, whereby electrons lost by $(F_2)_A$ centers in forming $(F_2^+)_A$ centers are trapped by the $F_A$ and $F_B$ centers to form $F_A$ and $F'_B$ centers with noninterfering near infrared absorption bands.

As described in Patent No. 4,301,426, the laser medium is an isotropic alkali halide crystal capable of absorbing light anisotropically, in which the alkali ion is in general either a lithium, potassium, or rubidium ion and the halide ion is a fluoride, chloride, bromide, or iodide ion, although certain extreme combinations such as rubidium fluoride would be of limited usefulness. It is also often possible to substitute alkaline earth ions, i.e., calcium, strontium, and barium, for alkali metal ions.

During growth, the alkali halide crystal is doped with an impurity cation in order for it to eventually contain ionic and electronic combinations of proper structure. The impurity cations are usually chosen so that they are smaller than the host-crystal cations, e.g., potassium chloride would be doped with either sodium or lithium. The color center used in the patent to produce broadly tunable lasing is the $(F_2^+)_A$ center. The $(F_2^+)_A$ and $F_2^+$ centers are oriented along [110] directions. The $(F_2^+)_A$ center is simplY a singlY ionized $(F_2)_A$ center; i.e., it consists of one electron trapped by two neighboring anion vacancies along a [110] direction, all being adjacent to a substitution cation impurity. Other color centers important for the laser material of Patent No. 4,301,426 include the $F_A$ center, which consists of one electron trapped in an anion vacancy adjacent to a substitutional cation impurity ion; i.e., an F center next to a cation impurity. The $F_B$ center consists of an F center adjacent to two cation impurities, while the $F_2^+$ center is an electron trapped by two anion vacancies; i.e., a singly ionized pair of neighboring F centers along a [110] direction. The $(F_2^+)_A$ center consists of an $F_2^+$ center next to a cation impurity.

The doped alkali halide crystal is prepared by additive coloring so that it initially contains at least $7 \times 10^{17}$ F-centers/cc uniformly dispersed throughout the crystal; exposing the crystal at a temperature from about 253° K. to about 300° K. to light in the high-energy shoulder of the F band, thereby converting F centers to $F_A$, $F_B$, $F_2$ and $(F_2)_A$ centers; and exposing the crystal to light in the high-energy shoulder of the F-band at a temperature of 100° K. or below, thereby randomly converting $F_2$ centers to $(F_2)_A$ through repeated reorientation processes while creating a dynamic equilibrium which forms $(F_2^+)_A$ centers from $(F_2)_A$ centers.

An important property of the $(F_2^+)_A$ center which permits the centers to be properly oriented with respect to the polarization of the laser cavity is optical alignability along a specific [110] crystallographic axis. This is possible since the center realigns when it absorbs light in certain of its optical transitions. Each of these transitions possesses an optical dipole moment lying either parallel or perpendicular to that [110] axis. Reorientation is generally induced through absorption either directly with light in the visible spectrum or through multiple photon excitation involving infrared transitions. If the electric-field vector of the incident light within the spectral range of the color center band has a component in the direction of the dipole moment, then the light is absorbed at a rate proportional to $COS^2\theta$, where $\theta$ is the angle between the dipole moment of the absorption and the electric field vector. Prolonged excitation with linearly polarized light continues to reorient centers until all lie along the crystallographic direction (or directions) which is perpendicular to the polarization of the light.

The preferred method for growing crystals for the laser device of the 4,301,426 patent is the Kryopoulis technique, wherein from 0.75 to 1.5 mole percent of a salt impurity such as sodium chloride is added to a melt of a material such as KCl. The resulting crystal, in the form of a platelet, is then additively colored to produce F centers, and mounted in a laser cavity, where the $(F_2^+)_A$ centers are generated, and are then caused to lase. Light was produced in a tunable wavelength range of 1.62 to 1 91 $\mu$m.

The Na-doped KCl laser described in Patent No. 4,301,426 and a Tl° (1) laser described by W. Gellermann et al in Opt. Commun. 39, page 391 (1981) and by L. F. Mollenauer et al in Phys. Rev. B27, page 5332 (1983) were the only two long-lived color-center lasers in the 1 to 2 $\mu$m region, until the description of another such laser by Joseph F. Pinto et al in an article entitled "Stable Color-Center Laser in K-doped NaCl Tunable from 1.42 to 1 76 m", Optics Letters, Vol 10, p. 384–6, Aug. 1985. In the Pinto et al article, it was pointed out that the Tl (1) laser operates over the 1.45–1.6 $\mu$m region with reasonable power but requires radiation damage to activate the crystals and cold-temperature storage at all times after coloration. It was also noted that the KCl:Na $(F_2^+)_A$ laser of Patent No. 4,301,426 offers the advantages of room-temperature storage and activation through the more accessible technique of additive coloration, although the power produced by this laser is less than 50 mW over its tuning range of 1.62 to 1.9 $\mu$m. $F_2^+$ lasers also exist throughout this region, but $F_2^+$ centers not only require radiation damage and cryogenic storage but also display an irreversible fading that limits the active laser lifetime to periods of hours.

Pinto et al. based their work on the $F_2^+$ laser in NaCl discussed by L.F. Mollenauer et al in Phys. Rev. Lett. 45, page 1095 (1980), which lases from 1.35 to 1.75 $\mu$m, and on the demonstration by I.Schneider, Opt. Lett. 6, page 157 (1981) of the shifts in emission bands for various $(F_2^+)_A$ centers. They described in their article the development of a more versatile laser in the important 1.4–1.8 $\mu$m region, which allowed continuous wave operation of an NaCl crystal color-center laser Pinto et al tentatively identified the lasing operation as being based on the $(F_2^+)_A$ defect in additively colored K-doped NaCl. The laser so produced tuned smoothly from 1.42 to 1.76 $\mu$m when pumped with a continuous wave Nd:YAG laser operating at 1.06 $\mu$m, and produced 530 mW at 1.6 $\mu$m when pumped with 6 W. Operation for periods exceeding 70 hours was monitored, with no observable fading in output power. As with lasers utilizing other known $(F_2^+)_A$ centers, output power was dramatically improved by exposing the laser crystal to an auxiliary UV light during operation. The 365-nm line of a low-power Hg lamp is a convenient source of this auxiliary light. Once additively colored, it was found that the crystals could be stored at room temperature with no degradation. As with all other cw color-center lasers, the crystal had to be cooled to about 77 K for efficient operation.

There were several novel features of the NaCl:K $(F_2^+)_A$ laser. First, the wavelength tuning range was unusually broad. The wavelength range bridged the small valley between the power-tuning curves of the Tl° (1) laser and the $(F_2^+)_A$ laser in KCl:Na. The tuning range of the NaCl:K $(F_2^+)_A$ laser almost totally encompassed the power-tuning curve of the Tl (1) system and was the first stable color-center laser to offer significant power in the 1.6–1.75 $\mu$m range.

Second, color centers in the NaCl:K crystals could be formed by additive coloration in a simple bomb. The simplicity and universal availability of this method of center creation are beneficial. The subsequent temperature stability of the centers allowed the crystals to be stored at room temperature for indefinite periods before laser operation.

Finally, the NaCl:K system represented the first reported $(F_2^+)_A$ laser that was pumped with the 1.06 $\mu$m line of a Nd:YAG laser; all other known $(F_2^+)_A$ lasers were pumped by either the less efficient 1.32 $\mu$m Nd:YAG laser or longer-wavelength lasers, such as the $Er^{3+}$:YLF laser.

The color center involved in the lasing process was tentatively identified as an $(F_2^+)_A$ center, based on similarities between the NaCl:K system and the other known $(F_2^+)_A$ centers in KCl:Li and KCl:Na. The $(F_2^+)_A$ center consists of a . singly-ionized $F_2$ center (two neighboring F centers) adjacent to a substitutional alkali impurity. In a given host lattice, the absorption and emission spectra of the $(F_2^+)_A$ centers are similar to those of the $F_2^+$ centers, but the exact transition energies are slightly shifted, depending on the impurity ion. Table 1 summarizes a comparison of published data on $(F_2^+)_A$ centers in KCl with measured data on various NaCl systems.

TABLE 1

Observed Absorption and Emission Wavelengths (in micrometers) for $F_2^+$ and $(F_2^+)_A$ Centers in NaCl and KCl

|  | NaCl Abs. | NaCl Ems. | KCl Abs. | KCl Ems. |
|---|---|---|---|---|
| Pure $F_2^+$ | 1.02 | 1.52 | 1.38 | 1.67 |
| K-doped $(F_2^+)_A$ | 1.06 | 1.55 | — | — |
| Na-doped $(F_2^+)_A$ | — | — | 1.24 | 1.74 |
| Li-doped $(F_2^+)_A$ | ? | 1.76 | 1.34 | 2.21 |

Table 1 shows that the size and the direction of the shifts in the emission bands of the perturbed $F_2^+$ bands in NaCl are consistent with shifts observed in the perturbed $F_2^+$ centers in Li- and Na-doped KCl. In both cases the smaller ion (Li) causes a large shift to longer wavelength, while the larger ions (Na or K) cause only a slight shift in the same direction. In the case of NaCl:Li the absorption band was too weak to be resolved. It was possible, however, to measure a weak luminescence by pumping the crystal with 1.06 $\mu$m radiation. These comparisons show that the observed characteristics of the NaCl systems were compatible with an $(F_2^+)_A$ model.

The NaCl:K crystals described in the Pinto article were obtained from the Crystal Growing Facility at Cornell University. They were grown with 0 5 mol % K in the NaCl melt. Subsequent atomic-emission analysis of the crystals showed the K concentration to be 0.28 mol %. Color centers were incorporated into the crystal by using a simple additive coloration technique. Cleaved sections of crystal approximately 3 mm × 5 mm × 15 mm were placed with 0.1 cm³ Na metal in a bomb consisting of two hollowed-out blank Conflat flanges (Varian Corp. Part No. 954-5077) tightly bolted together with a Cu gasket to form a hermetic seal. The bomb was placed in a 700° C. oven for 90 min, then removed and allowed to cool to room temperature by natural convection. After coloration the crystals had a uniform blue color, which was due to absorption bands from the various types of color centers present as well as from colloids of Na metal in the crystal. (Colloids are large aggregations of F centers.) The colloid absorption band typically extended from 0.5 μm to beyond 2 μm, with an average absorption of 2 cm$^{-1}$. The colloids were completely dispersed by wrapping the crystal in Cu foil and annealing it for several minutes at 700° C., after which the crystal appeared an orange-yellow color. The duration of the annealing process depended on crystal thickness, varying from 3.5 to 8 min for crystals ranging from 2 to 4 mm thick. Spectra of the crystal taken after annealing showed that a strong F band and a moderate $F_2$ band remained in the crystal.

Using Smakula's formula and neglecting the population contained in the $F_2$ band, the remaining F-center density was calculated to be $4 \times 10^{17}$cm$^{-3}$.

Following the annealing process, the crystal surfaces were sanded flat and polished in normal room light with 0.05 μm polishing compound dampened with pure methanol. The crystal was then clamped to an In-clad Cu cold finger of the laser Dewar. After evacuation of the laser Dewar, the crystal was processed to form $(F_2^+)_A$ centers following the method described by I. Schneider et al in Opt. Lett. 4, p 390 (1979). The crystal was cooled to about −10° C. and exposed to 365 nm light for 1 hour. The UV light was obtained from a 100 W Hg lamp filtered through a 10 cm cell filled with a CuSO$_4$ solution. Continuing the UV exposure, the temperature was reduced to −60° C. for an additional hour; finally the crystal was cooled to 77° K. These steps caused the F band to broaden slightly toward the red and the $F_2$ band to increase in size and shift 30 nm to the red. Both shifts were consistent with other well-studied $F_A$ and $(F_2)_A$ systems and represented the formation of significant densities of $F_A$ and $(F_2)_A$ centers.

During the aggregation process, an absorption band centered at 1.06 μm appeared, growing to an eventual 35% absorption depth. This band was tentatively identified as the $(F_2^+)_A$ absorption band and was shifted slightly from the measured absorption band of the $F_2^+$center in NaCl (see Table 1). An unusual feature of this band was its continued presence with the same absorption strength after three days of room-temperature storage in weak room light. This indicated that the electron traps involved in stabilizing the electrons liberated from the $(F_2)_A$ centers were moderately stable at room temperature. The identity of these traps was not known, but in analogy to the KCl systems, the traps were believed to be $F_A$ or similar centers. Because an overall baseline absorption owing to colloid formation slowly grew under these warm conditions, absorptive loss for the pump band and emission band of the laser became unacceptably large over increased storage time at room temperature. Therefore it was found optimal to anneal and process the crystal immediately before laser operation.

The crystal was mounted at the Brewster angle on a cold finger attached to a liquid-N$_2$ Dewar. The crystal was positioned between two bellows-mounted antireflection-coated fused-silica lenses (focal length 50 mm). The lenses served to focus the intracavity radiation to a 30 μm-radius spot in the crystal and to form vacuum windows for the Dewar. Astigmatism was easily compensated by tilting the lenses to about a 6° angle to the beam axis, and cavity stability was insured by translating the lenses to optimize operation. The lenses' antireflection coating was centered at 1.62 μm. The end mirrors were dielectrically coated flat substrates. Tuning was accomplished with a single sapphire prism. The pump laser was directed into the cavity collinearly through a dichroic high reflector and was focused by the same cavity lens onto the crystal. A weak lens was used between the pump laser and the color-center laser to mode match the beams inside the crystal. 365 nm light from a filtered Hg lamp was focused onto the crystal through a window on the front of the laser Dewar.

Tuning was accomplished by rotating the output mirror. The wavelength tuning range extended from 1.42 to 1.76 μm, peaking at 1.6 μm. The upper limit closely matched the wavelength where the dichroic mirror sharply loses reflectivity, so it is likely that the tuning range could be extended to longer wavelengths with suitable optics. Indeed, the measured fluorescence curve 5 had a tail extending out beyond 1.9 μm.

The output power varied with the output wavelength, peaking about 550 mW at 1.6 μm, utilizing 10% output coupling. Substituting a 35% coupler for the output mirror reduced both the power and the tuning range. The pump power of 6W was provided from a continuous wave 1.06 μm Nd:YAG laser operating in the TEM$_{OO}$ mode. More than 3.5 W of the power passed through the system unabsorbed, so that the efficiency of the output power versus absorbed power exceeded 20%. The polarization of the pump laser matched the polarization of the color-center laser.

The output power from the NaCl:K laser described in the Pinto et al. article was truly continuous wave (there were no choppers in the pump beam to reduce the average power on the crystal). The NaCl:K laser did not display the significant thermal loading that is common to many other color-center lasers operating at these power levels, but showed a nearly linear relation between input power and output power. Power was measured with a calibrated thermopile power meter.

The laser was used for several weeks and accumulated more than 70 hours of operation from one spot on the crystal, with no observable fading or decrease in the output power. This stable behavior was consistent with that of other known $(F_2^+)$ lasers. Similar to other $(F_2^+)_A$ lasers, the output power was enhanced by exposing the crystal to UV light during laser operation. In contrast to other $(F_2^+)_A$ systems, however, it was found that when the UV light was extinguished, the output power decayed slowly over a period of an hour but never dropped below threshold. Once the UV light was restored, the power quickly rose to its previous level. The UV light most likely caused reorientation of the $(F_2^+)_A$ centers in the lattice. Intense pumping from the Nd:YAG laser can cause the centers to realign in such a way that their dipole moments become unfavorably oriented with respect to the cavity mode. It is believed that the UV serves to randomize the orientation. The amount of UV required to maintain lasing is minuscule. As measured on the thermopile, the maximum amount of UV light being focused onto the crystal was 130 mW. Reduction of the UV power to 20 mW reduced the output power by less than 10%; reduction of the UV light to 0.4 mW caused the laser power to drop only 30%.

The foregoing laser produced broadly tunable lasing from what was thought to be the $(F_2^+)_A$ color center in a K-doped NaCl crystal. This crystal could be colored by a simple, and universally accessible, method of additive coloration, and, once colored, the crystals had an essentially infinite shelf life. In addition, the laser was conveniently pumped by the 1.06 μm Nd:YAG laser, and had a broad tuning range which encompassed, with useful power levels, the important wavelength region from 1.42 to 1.76 μm.

Although the K-doped NaCl laser reported by the Pinto et al. article operated as described above, difficulties arose, in that efforts to optimize the laser through modification of the K-dopant level proved to be unsuccessful, and other researchers were unable to reproduce the reported results. Furthermore, investigation of the NaCl:K crystal revealed that the laser-active center was not an $(F_2^+)_A$ color center, for chemical analysis of many of the laser-active crystals showed that the alkali impurities, such as K (or Li) had concentrations of less than 2 ppm. Such low concentrations precluded the possibility that the laser-active center was an $(F_2^+)$ center, for in other established $(F_2^+)_A$ outer systems, impurity dopant levels of 103-104 ppm are necessary to create modest numbers of $(F_2^+)_A$ centers. Accordingly, it became clear that the potassium impurity added to the NaCl crystal during the melt did not produce the lasing action, and the NaCl:K crystal did not meet the need for a laser capable of operation in the 1-2.μm wavelength range.

SUMMARY OF THE INVENTION

Accordingly, it is an object of the present invention to provide, in a reproducable manner, a color-center which will produce laser output in the wavelength range of 1 to 2 μm, with a significantly higher power level and stability than was previously available in color-center lasers.

A further object of the invention is to provide a color-center laser which will provide stable operation at a higher power level than was previously available in the wavelength range of 1 to 2 μm.

Another object of the invention is to provide a color center laser that is relatively easy to make, which can be easily reproduced, and which provides a stable output at significant power levels in the wavelength range of 1.41-1.77 μm.

The present invention is based on the discovery that a stable relatively powerful color center lasing action is produced in an alkali halide crystal which is doped with a significant quantity of a hydroxyl ions. More particularly, the present invention is directed to an improved color center laser, wherein the lasing action is based on an oxygen-impurity stabilized color center within an alkali halide crystal. Such a laser is formed from alkali halide crystals such as NaCl grown with 10-100 ppm OH$^-$ in the melt. UV absorption spectra of such hydroxyl ion-doped crystals reveal that after coloration, anion "vacancy-$O^{3l}$" centers exist, along with U-centers (H- ions trapped in anion vacancies). Exposure of these crystals to UV light is believed to cause individual F centers to aggregate with the vacancy-$O^-$centers to form $F_2^+$:$O^-$ centers, which consist of an $F_2^+$center beside an $O^-$ion Such a center is believed to be extremely stable, because the negatively-charged electron trap (i e., the $O^-$ion) is adjacent to the positively charged laser-active $F_2^+$center, and is trapped by Coulomb attraction. Moreover, the color-center system has overall charge neutrality, so that there is no further aggregation of color centers, thus yielding a stable center. Furthermore, the $O^-$ion serves to spatially pin the $F_2^+$center in the crystal lattice, preventing destructive migration.

The additively colored NaCl:OH$^-$crystals can be grown by any method which assures optical quality. The preferred method is the Kyropoulis technique wherein appropriate amounts of NaOH are added to the NaCl melt. The optimum concentration of incorporated OH$^-$in the crystal lattice is in the 10-100 ppm range as determined from Fourier Transform IR spectroscopy measurements of the OH$^-$vibrational band at 3654 cm$^{-1}$. A second method of determining OH$^-$concentration is by U.V. absorption measurements of the OH$^-$electronic transition at 185 nm.

NaCl:OH crystals with OH$^-$concentrations exceeding the optimum range will form a weaker laser active absorption band. Such highly doped crystals can be distinguished by a second U.V. absorption band at 250 nm, corresponding to the $O_2^-$ion, a product of OH$^-$ion aggregation.

Cleaved sections approximately 4 mm. thick are taken from the boule and additively colored in a heat pipe at Na vapor pressures ranging from 10-60 torr for 30 minutes A 20 torr Na vapor pressure provides an optimum coloration density in the crystals, corresponding to an F-center concentration of approximately $7 \times 10^{17}$cm$^{-3}$. Higher pressures or longer coloration times gradually lead to the formation of colloids. These colloids have significant absorption in the 0.5 to 2 μm region, and inhibit lasing in the crystals. Lower coloration pressure form weaker absorption bands of the laser active center. Following coloration, the crystals have a uniform olive green color due to optical absorption from the various color centers formed in the crystal. Colored crystals are highly stable and can be stored for indefinite periods at room temperature (in the dark) with n apparent degradation in their laser performance No further annealing is required prior to laser use for properly colored crystals.

The crystal so produced provides a stable, powerful, color-center laser action based on the $F_2^+$:$O^-$color center When the crystal is pumped by a continuous wave Nd:YAG laser at 1.06 μm operating at 9W, the laser produces over 1.25W of output power at 1.6 μm, and has a tuning curve which extends from 1.41 to 1.81 μm. This crystal represents the first powerful source of tunable radiation above 1.6 μm, and extends well beyond the Tl° (1) laser in KCl in both power and range. Furthermore, the crystal of the present invention is capable of generating mode locked pulses of 5.5 psec duration in a synchronously pumped arrangement, the pulsed output being tunable from 1.47 to 1.73 μm, with an average power of 450 mW at the peak of the tuning curve. These crystals thus provide shorter mode locked pulses than were previously available. Further, the crystals may be stored for several weeks at room temperature, with no apparent degradation.

BRIEF DESCRIPTION OF THE DRAWINGS

The foregoing, and additional objects, features, and advantages of the present invention, will be more clearly understood from a consideration of the following detailed description of a preferred embodiment hereof, taken in conjunction with the accompanying drawings, in which.

DESCRIPTION OF THE PREFERRED EMBODIMENT

Figure 1:
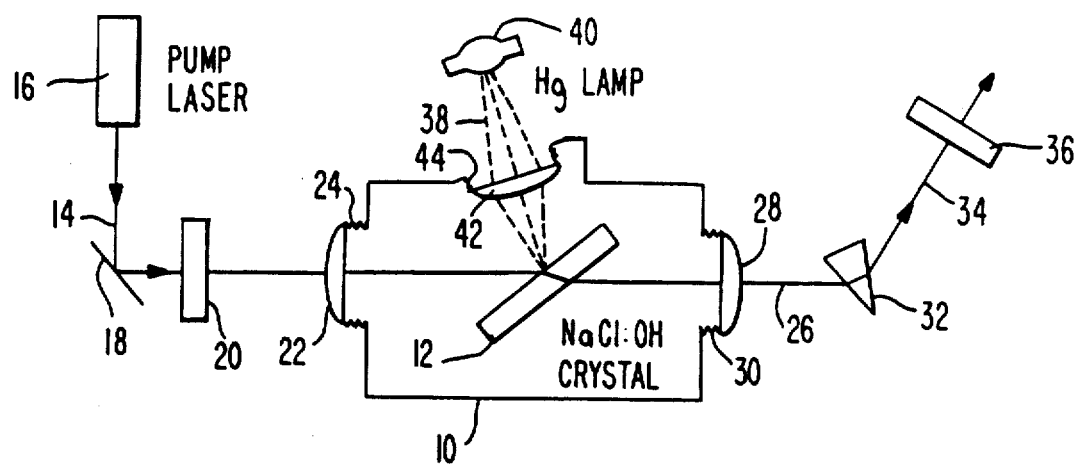
FIG. 1 is a diagramatic illustration of a color center laser.

In accordance with the present invention, alkali halide crystals such as NaCl are grown in any conventional manner preferably using the Kyropoulis technique, with an impurity consisting of 10–100 ppm OH$^-$in the melt. The resulting NaCl:OH crystals are additively colored in a heat pipe, by placing crystals within a hermetically sealed chamber, in the manner described in the Pinto et al. article. The chamber is placed in an oven and its temperature increased to produce coloration of the crystals, with optimum coloration being found to occur at 20 Torr Na vapor pressure within the chamber The coloration process produces various types of color centers in the crystals, as well as colloids of Na metal, such colloids being large aggregations of F centers The colloids are completely dispersed by wrapping the crystal in Cu foil and annealing at 700° C. for a time dependent on the crystal thickness The crystal then has an F center concentration of approximately $7 \times 10^{17}$ cm$^{-3}$. After such coloration, the NaCl:OH crystals are highly stable, and may be stored in the dark for several weeks at room temperature with no apparent degradation After annealing, the crystals are typically cleaved to $3 \times 5 \times 10$ mm dimensions, and are then polished and mounted at Brewsters angle in a laser cavity, this being done in full, normal room light. The crystal is clamped, for example, on an In-clad Cu cold finger of the laser vacuum chamber, or Dewar. The Dewar is then evacuated, and while this is occurring, the crystal is exposed to 365 nm light from a filtered Hg lamp for 1 hour at room temperature. This exposure causes a photoaggregation process to occur, which produces a broad absorption band centered at 1.04 μm. This band grows to an eventual depth of about 65% absorption in a 3 mm thick crystal.

Following the room temperature photoaggregation, the NaCl:OH crystal is cooled to 77° K. and again exposed to 365 nm L light This step causes the absorption band to shift to 1.09 μm within a matter of seconds. This 1.09 μm band is relatively wide, extending from about 1.0 to 1.2 μm, and conveniently overlaps the powerful 1.06 μm output line of an Nd:YAG laser. Following this second photoaggregation, the NaCl:OH crystal is ready to lase.

It is believed that the active color center in the NaCl:OH crystal is a perturbed $F_2^+$center, since the ground and excited state absorption spectrum of this color center shows a great similarity to that of the $F_2^+$center in pure NaCl, with the transition energies of several of the observed bands slightly shifted to lower energy. This shift is consistent with the observed perturbation effect of alkali impurities such as K or Li on the spectra of the color center in NaCl crystals. Such alkali impurity color centers were thought to have been the $(F_2^+)_A$ center, but more recent investigations have shown that the concentration of such impurities is too low to produce a laser-active $(F_2^+)_A$ center, as explained above.

To illustrate the importance of the hydroxyl ion impurity in the NaCl crystal, a pure NaCl boule, which did not form an absorption band at 1.04 μm, was melted and regrown with 100 ppm NaOH added to the melt. The NaCl stock was pretreated with chlorine to eliminate unintentional OH$^-$contamination prior to doping. After coloration of the regrown crystal, a strong laser-active band appeared at 1.04 μm.

UV absorption spectra of the NaCl:OH crystal reveal that after coloration of an OH-doped crystal, anion "vacancy-0$^-$" centers exist, along with U-centers, which are H$^-$ions trapped in anion vacancies. It is believed that exposure of these crystals to UV light causes individual F centers to aggregate with the vacancy-0$^-$centers to form $F_2^+$:0$^-$centers, which consist of an $F_2^+$center beside an 0$^-$ion Such a center is extremely stable, because the electron trap (the 0$^-$ion) is adjacent the laser-active $F_2^+$center, so the system has overall charge neutrality. Further, the 0$^-$ion serves to spatially pin the $F_2^+$center in the lattice, preventing destructive migration.

The color center laser cavity for the present crystal is similar to other color center lasers in design, and is illustrated in FIG. 1 as including a vacuum Dewar 10 in which is mounted an NaCl:OH crystal 12 at the 30 μm beamwaist of the cavity. The output beam 14 from a pumping laser 16, which preferably is an Nd:YAG laser, is directed by way of mirror 18 and dichroic mirror 20 to the Dewar, and is colinear with the cavity beam to insure an efficient overlap of the pump and laser beams within the crystal 12. The beam 14 is directed into the cavity by way of lens 22, which may be mounted on bellows 24 to allow the beam to be focussed onto the crystal, while maintaining the integrity of the vacuum. The output beam 26 from the laser passes through a lens 28 mounted on bellows 30 in the wall of the Dewars vessel 10, to focus the beam. The output beam 26 is directed to a tuning device, such as a single sapphire Brewster prism 32, which directs the selected single frequency output beam 34 to an output coupler 36. Alternative tuning devices may be utilized, such as quartz birefringent plates, if desired..

During lasing, an auxiliary UV light beam 38, is directed onto the active region of the crystal 12. This beam is a 365 nm light beam generated by an Hg lamp 40 and focussed onto the active region of the crystal by a lens 42 mounted by means of bellows 44 in the side wall of the Dewars 10. The action of the UV light is not fully understood, but without this auxiliary light exposure, the laser output is reduced to about 20% of the full power available when the UV light is present. The presence of only a few milliwatts of UV is sufficient to fully activate the crystal. It has been found that intense pumping of the crystal by the pump laser 16 can realign the lasing color centers in the crystal 12, causing a bleaching of the absorption band, and it is thought that the presence of the UV auxiliary light may serve to randomize the distribution of color center orientations so as to prevent such bleaching.

Figure 2:
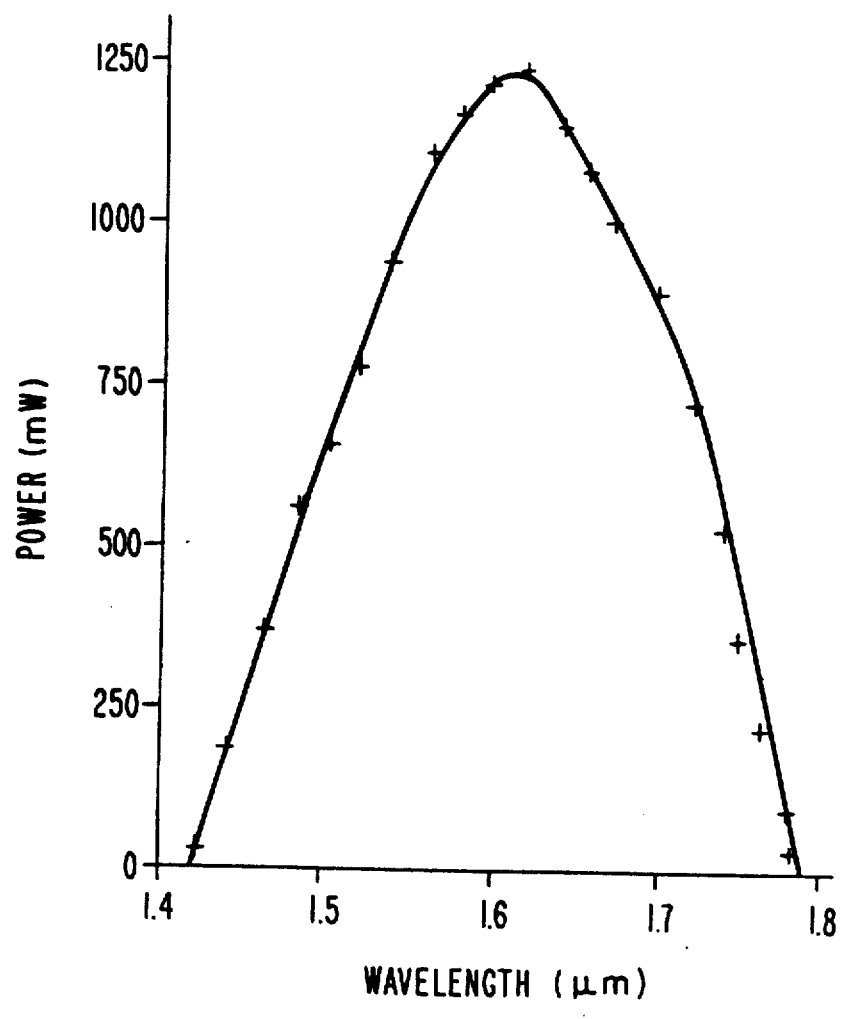
FIG. 2 is a tuning curve for the laser of FIG. 1.

As illustrated in FIG. 2, the laser tuning curve, as measured with a thermopile at the output coupler 36, produces over 1.25 W of power at 1.6 μm when pumped with a 9W, continuous wave Nd:YAG laser having a pumping beam at 1.06 μm. The laser can be tuned from 1.41 μm to 1.77 μm, thus providing a powerful source of tunable radiation at the specified wavelengths.

The laser of the present invention can be mode-locked using synchronous pumping with a mode-locked Nd:YAG laser. A stable pulse train with pulse durations of 5.5 to 6.5 psec over the tuning range of 1.47 to 1.73 μm has been obtained, with an average power at the peak of the tuning curve of 450 mW. It was found that the pulse widths did not vary as the pump power was reduced from an average value of 3.8 W down to threshold

EXAMPLE

Numerous NaCl crystals doped with various amounts of OH− were obtained from the Crystal Growing Facility at Cornell University and from the Crystal Growth Laboratory of the University of Utah. OH− was incorporated into the crystal by addition of appropriate amounts of NaOH to the melt. The optimum concentration of incorporated OH− in the crystal is in the 10-70 ppm range as determined from Fourier Transformer IR spectroscopy measurements of the OH− vibrational band at 3654 cm$^{-1}$ Cleaved sections approximately 4 mm thick were taken from the boule and additively colored in a heat pipe at 20 torr Na vapor pressure and 700° C. for 30 minutes This vapor pressure provided an optimum coloration density in the crystals, corresponding to an F-center concentration of approximately $7 \times 10^{17}$ cm$^{-3}$. Higher pressure or longer coloration times gradually led to the formation of colloids (large aggregates of F-centers). These colloids had significant absorption in the 0.5 to 2 μm region which inhibited lasing in the crystals Lower coloration pressure simply formed weaker absorption bands of the laser-active center. Following proper coloration, the crystals had a uniform olive-green color due to optical absorption from the various color centers formed in the crystal Colored crystals were highly stable and could be stored for weeks at room temperature with no apparent degradation in their laser performance. No further annealing was required prior to laser use for properly colored crystals.

A colored laser crystal was typically sanded to $3 \times 5 \times 10$ mm dimensions, and polished in normal room light with 0.05 μm polishing compound dampened with pure methanol The polished crystal was then clamped to an In-clad Cu cold finger and mounted at Brewster's angle in the laser cavity. Following this procedure, the crystal was exposed at room temperature for one hour to 365 nm light obtained from a 100 watt Hg lamp filtered through a 10 cm cell filled with $CuSO_4$ solution. This exposure caused a photoaggregation between color centers and defects, producing a broad absorption band centered at 1.04 μm with a 70% small signal absorption in a 3 mm thick crystal. Longer exposure times did not provide any benefit since the absorption band reached a saturation level. However, the aggregation temperature was important: if the photoaggregation was done at reduced temperatures (<10° C.), the 1.04 μm band did not form to its full depth. Following this room temperature photoaggregation, the crystal was cooled to 77° K. and exposed again to 365 nm light. This second exposure caused the absorption band to shift to 1.09 μm within a matter of seconds, forming the laser active center.

The initial 1.04 μm band had approximately the same spectral width and position as the $F_2^+$ center in pure NaCl, and displayed polarized absorption and emission along the [110] axis of the cubic lattice. However, its absorption peak was slightly red shifted from the reported $F_2^+$ absorption band, possibly indicating a perturbation by a neighboring impurity ion, such as OH−. The shifted 1.09 μm band was relatively wide (extending from 1.0 to 1.2 μm), and conveniently overlapped the powerful 1.06 82 m line of the Nd:YAG laser.

It is theorized that this laser active color center was a perturbed $F_2^+$ center. Polarized absorption spectra of the 1.09 μm band indicated that the color center defect was aligned along a [110] direction in the crystal and could be reorientated with UV light. The absorption and emission bands of the center were shifted to slightly lower energy as compared to the NaCl $F_2^+$ center. This shift was consistent with the perturbation effect observed with alkali impurities on the spectra of the $(F_2^+)_A$ center However, chemical analysis of the laser active crystals indicates that alkali impurities, specifically K or Li, have concentrations well below 2 ppm. Thus the active center is not an $(F_2^+)_A$ center as was previously suggested in the Pinto et al. article.

NaCl crystals which contained no OH− did not form either the 1.04 or 1.09 μm absorption band upon coloration. To further test the identification of OH− as the key dopant in the NaCl crystals, an NaCl boule which was nominally pure, and that did not form the laser active 1.09 μm band after coloration, was selected. Upon regrowth of the same crystal with 100 ppm NaOH added to the melt, a powerful laser crystal was formed with a strong 1 09 μm absorption band following coloration and aggregation procedures.

Optical and thermal properties of the laser active color center show a great similarity to other perturbed $F_2^+$ systems observed in OH-doped NaF [the $(F_2^+)^{**}$ center] and OH-doped LiF. There is evidence that the center consists of an $F_2^+$ center adjacent to an $O^{2-}$ ion, which is substitutionally located at an anion location of the crystal. The presence of OH− in the NaCl samples can be confirmed by observing the strong electronic transition of oxygen in the UV region. Absorption spectra of colored and uncolored NaCl:OH− crystals have been recorded at room temperature in the wavelength region between 190 nm to 320 nm using a Cary 219 spectrophotometer. For uncolored NaCl:OH− samples, with OH− concentrations less than approximately 100 ppm, only the tail of an absorption peak at 185 nm is observed corresponding to the OH− ion Following additive coloration, the OH− ion dissociates to form U-centers (H− ions trapped in anion vacancies) and $O^{2-}$-vacancy dipoles, with corresponding UV absorptions at 190 nm and 228 nm, respectively. The $O^{2-}$-vacancy dipole consists of a substitutional $O^{2-}$ ion located beside an anion vacancy Although quite tentative, the proposed $F_2^+$:$O^{2-}$ model assumes that exposure of these crystals to UV light at room temperature causes individual F-centers to aggregate with $O^{2-}$-vacancy dipoles Such a color center should be extremely stable, since the products of the OH− dissociation form stable electron traps, which enhance the production of electron-deficient centers. Furthermore, the $O^{2-}$ ion serves as a strong electronegative point defect in the lattice which is probably capable of trapping the $F_2^+$ center beside it, thus preventing destructive migration effects.

Figure 3:
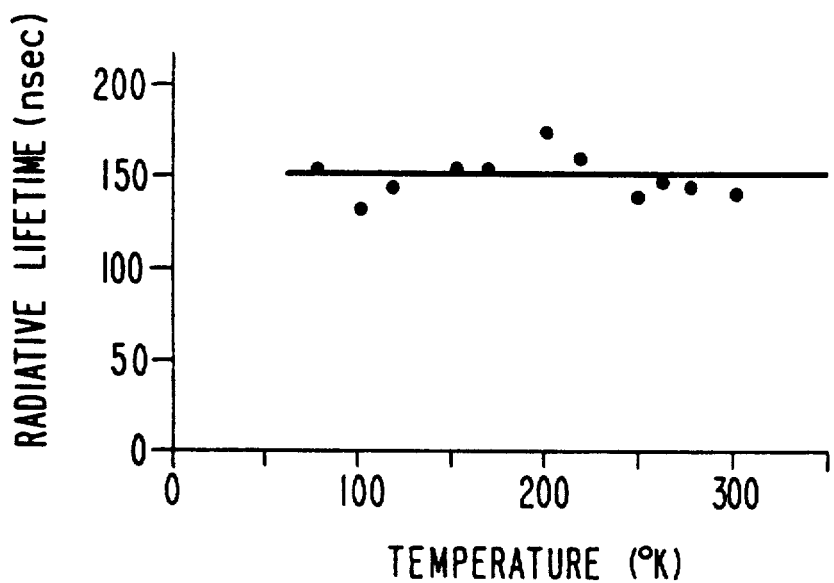
FIG. 3 is a graphical illustration of the radiative lifetime of an NaCl:OH color center crystal as a function of temperature.

Best results to date have been obtained for low OH− concentrations between 10-70 ppm. Above this hydroxyl concentration, the NaCl crystals do not form strong color center absorption bands. Such highly doped crystals can be distinguished by a prominent UV absorption band at 248 nm, corresponding to the $O_2^-$ion, a product of $OH^-$ ion aggregation Spontaneous emission lifetime measurements of this color center indicate a radiative decay time of approximately 150 nanoseconds, corresponding to a gain cross section of $\sigma = 8.5 \times 10^{17}$ cm$^2$. As shown in FIG. 3, the measured lifetime appears to be temperature independent for temperatures ranging from 85° K. to 330° K., suggesting the absence of phonon-assisted nonradiative decay processes from the upper laser level. In view of this, it may prove possible to operate this laser at elevated temperatures. However, as the temperature rises above 100° K., the absorption band becomes wider and shallower, resulting in poorer pumping efficiency. The cw laser power drops linearly with increasing temperature above 100° K., until reaching threshold around 180° K. When pumped at room temperature with a chopped cw Nd:YAG laser, occasional weak single spikes of laser emission at the start of each pump pulse have been observed.

Figure 4:
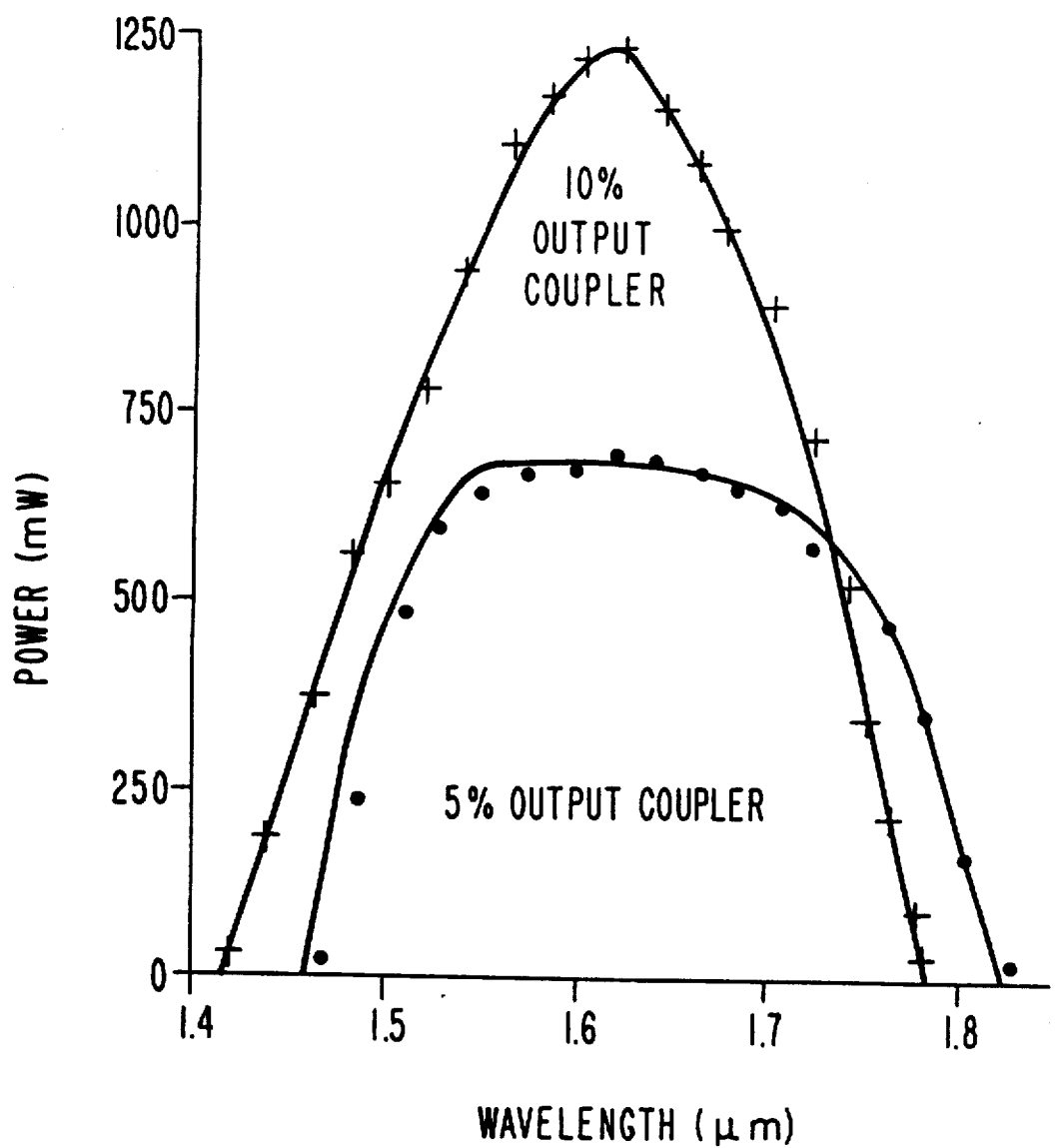
FIG. 4 illustrates the power turning curves for a cw NaCl:OH color center laser.

A crystal was placed at Brewster's angle at the 30 μm beam waist of the cavity. Tuning was accomplished with a single quartz or sapphire Brewster prism. Power tuning curves obtained from the laser are shown in FIG. 4 for both 5% and 10% output coupling. The differences in tuning range for the two output couplers was in part due to the rapid decrease in the reflectivities of the couplers near the tuning extremes. The flat power profile of the 5% coupler indicates undercoupling of the laser.

Figure 5:
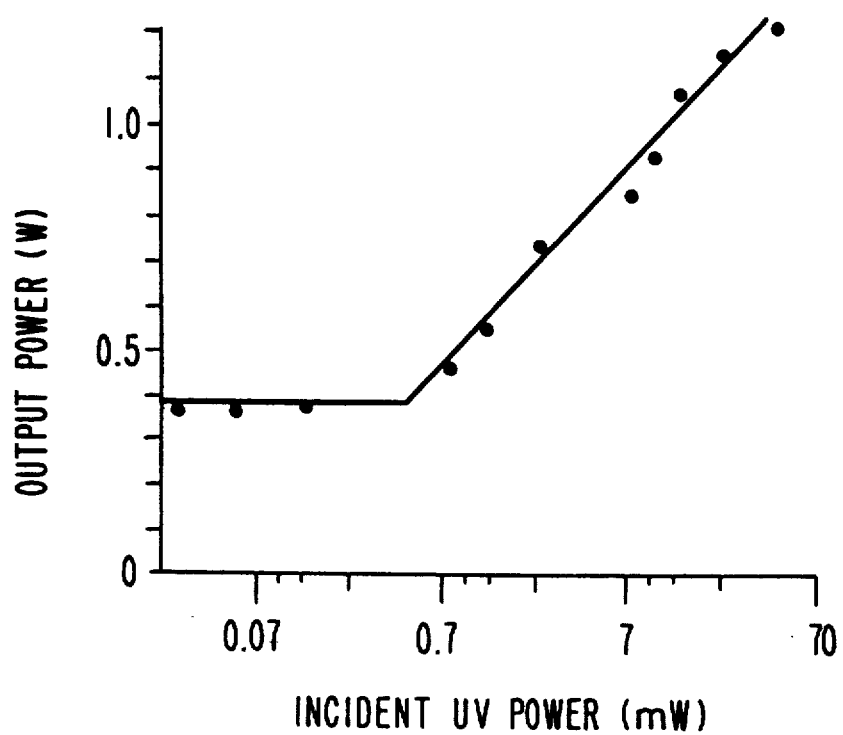
FIG. 5 illustrates the output power as a function of incident UV power.

During lasing, 365 nm light from the filtered Hg lamp was focused onto the crystal through a window on the front of the laser Dewar. Without auxiliary light exposure, the laser output power was reduced to about 30% of full power. Output power increases logarithmically with UV exposure, which is similar to the behavior of the $(F_2^+)_A$ laser in KCl:Li. FIG. 5 shows a semilog plot of laser power versus UV power.

Finally, the NaCl:OH$^-$ laser was modelocked using synchronous pumping techniques with a modelocked Nd:YAG laser. Stable pulse trains with pulse durations of 4.0–6.5 psec over the tuning range from 1.47 to 1.73 μm were obtained when using pump pulses of approximately 120 psec duration. A birefringent tuner plate (1 mm thick sapphire) or a dispersing prism was required in the cavity to obtain modelocked pulses with no excess bandwidth. Average power at the peak of the tuning curve exceeded 450 mw. The pulse widths did not vary appreciably with tuning or as the pump power was reduced to threshold.

The NaCl:OH$^-$ laser of the present invention represents a significant improvement in output power and tuning range over presently available color center lasers in the 1.6 μm region. Perhaps the most important characteristic of this new color center laser is its dramatic stability as compared to other presently known alkali-halide-based color center lasers. Properly colored laser crystals can be stored at room temperature for extended periods in the dark (months) with no observable degradation of laser performance. Operationally, no fading of the output power has been observed after 200 hours of active use.

Although the present invention is described in terms of a preferred embodiment, various modifications will be apparent to those skilled in the art.

What is claimed is:

1. A tunable operation-stable laser material which comprises a sodium chloride crystal incorporating oxygen impurities, said crystal having a crystallographic structure containing point defects comprising anion vacancy $-1^-$ centers having adjacent thereto $F_2^+$ color centers forming $F_2^+:O^-$ centers thereby providing a lasing capability, said crystal being prepared by a method which comprises:

forming a sodium chloride crystal containing an oxygen-impurity dopant;

additively coloring said doped sodium chloride crystal;

exposing the resultant crystal to UV light to produce a broad absorption band centered at about 1.04 μm; in said crystal;

cooling said crystal and again exposing it to UV light to shift said absorption band to about 1.07 μm;

thereby providing said $F_2^+:O^-$ color centers.

2. The laser material as in claim 1 where the oxygen impurity dopant is hydroxyl ion.

3. The laser material as in claim 2 where the starting crystal material, prior to being doped with hydroxyl ions, is treated to eliminate preexisting hydroxyl ion contamination.

4. The laser material as in claim 2 wherein oxygen-impurity dopant is added to the NaCl crystal to provide 10–70 ppm OH in the crystal.

5. A operation stable laser material useful for a solid-state tunable laser which comprises a sodium chloride crystal incorporating oxygen impurities, said crystal having a crystallographic structure containing point defects comprising anion vacancy $-O^-$ centers having adjacent thereto $F_2^+$ color centers forming $F_2^+:O^-$ centers which provide lasing capability.

6. The laser material as in claim 5 wherein the oxygen impurity is hydroxyl ion.

7. The laser material as in claim 5 wherein the $O^-$ centers are electron traps for the $F_2^+$ color centers.

8. The laser material as in claim 6 containing 10 to 100 ppm hydroxyl ion.

9. The laser material as in claim 5 which displays broadband polarized absorption along an axis at .09 μm and has an emission tunable between about 1.42 to 1.76 μm.

* * * * *